Figure 1:
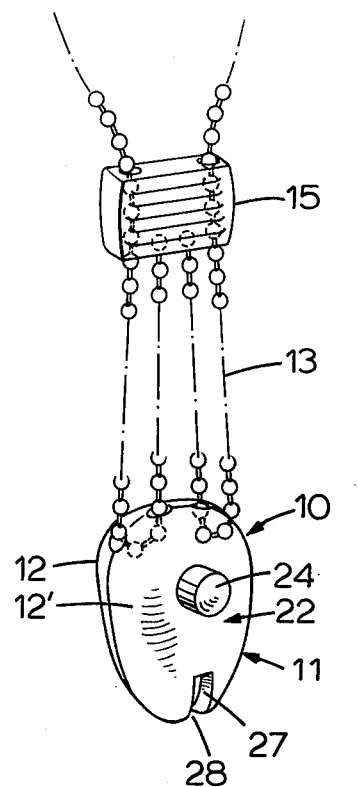

United States Patent [19]

Singular

[11] 3,930,289
[45] Jan. 6, 1976

[54] COUPLING DEVICE

[76] Inventor: John W. Singular, 566 Paisley Road, Guelph, Ontario, Canada

[22] Filed: Oct. 15, 1974

[21] Appl. No.: 515,051

[52] U.S. Cl. ............................ 24/201 S; 24/230 AT
[51] Int. Cl.[2] ................. A44B 17/00; A44B 19/00
[58] Field of Search ........ 24/201 R, 201 BN, 201 S, 24/201 SL, 230.5 S, 230 SL, 265 CC, 230 AV, 230 AS, 230 AT, 230 R, 231, 236, 201 A

[56] References Cited
UNITED STATES PATENTS

| | | | |
|---|---|---|---|
| 1,459,674 | 6/1923 | Jabner | 24/230 AT |
| 2,016,827 | 10/1935 | Bergstrom | 24/230 AT |
| 2,784,475 | 3/1957 | Schmitt | 24/230 AT |
| 3,793,858 | 2/1974 | Jones | 24/201 A |

FOREIGN PATENTS OR APPLICATIONS

| | | | |
|---|---|---|---|
| 337,193 | 5/1921 | Germany | 24/230 SL |

*Primary Examiner*—Donald A. Griffin

[57] ABSTRACT

For releasably interconnecting a first member and a second member such as, for example, a neck band or strap having a depending chain or the like and a musical instrument such as a saxophone there is provided a coupling device comprising a housing to which the chain is connected, opposed closure members being mounted within the housing with adjacent end portions of the closure members being resiliently urged by the inherent resiliency of the closure members towards a closed condition in which the saxophone is connectible thereto. A manually operable actuating member is mounted on the housing and is movable between a first position in which a portion of the actuating member which is of frusto-conical form, permits the adjacent end portions of the closure members to attain the closed condition, and a second position in which the frusto-conical portion of the actuating member urges the closure members to an open condition of the above-mentioned adjacent end portions thereof against the influence of the resilient urging of the closure members.

5 Claims, 2 Drawing Figures

U.S. Patent  Jan. 6, 1976  3,930,289

COUPLING DEVICE

This invention is concerned with a coupling device by which a first member may be releasably connected to a second member, the coupling device permitting said members to be quickly and conveniently interconnected and disconnected.

In the playing of certain musical instruments and particularly a musical instrument which is relatively heavy such as, for example, a saxophone, it is conventional for a neck band or strap to be disposed around the neck of the musician, one end of a depending chain arrangement or the like being connected to the neck band or strap and the other end thereof being provided with a coupling device for releasable connection to the saxophone. In this manner the weight, or at least a substantial proportion of the weight, of the saxophone may operatively be supported by the neck of the musician thereby relieving the musician of the need to support this weight by his arms. It has hitherto been conventional for the coupling device in such a system to be constituted by a conventional hook which is releasably connectible to a ring member or the like mounted on the saxophone.

The use, however, of a conventional hook as the coupling device in such a system has not been entirely satisfactorily and it is a primary object of the present invention to provide an improved coupling device which can be substituted for the conventional hook in the above-mentioned system, although it is to be emphasized that a coupling device according to the present invention is not restricted to being used only in a system as hereinbefore described but may be used for releasably interconnecting substantially any first member with substantially any second member.

A coupling device according to the present invention comprises a housing to which a first member is connectible, opposed resilient closure members mounted in the housing with adjacent end portions of said closure members being urged by the inherent resiliency of the closure members towards a closed condition in which a second member is connectible thereto, and an actuating member which is mounted on the housing. The actuating member is movable between a first position in which the actuating member permits said adjacent end portions of the closure members to attain said closed condition under the influence of said inherent resiliency of the closure members, and a second position in which the actuating member is in contact with the closure members to maintain said adjacent end portions thereof in an open condition against the influence of said inherent resiliency of the closure members. The actuating member has opposed cam faces for urging the closure members against said inherent resiliency of the closure members from said closed condition to said open condition of said adjacent end portions of the closure members on said movement of the actuating member from said first position to said second position thereof.

Figure 2:
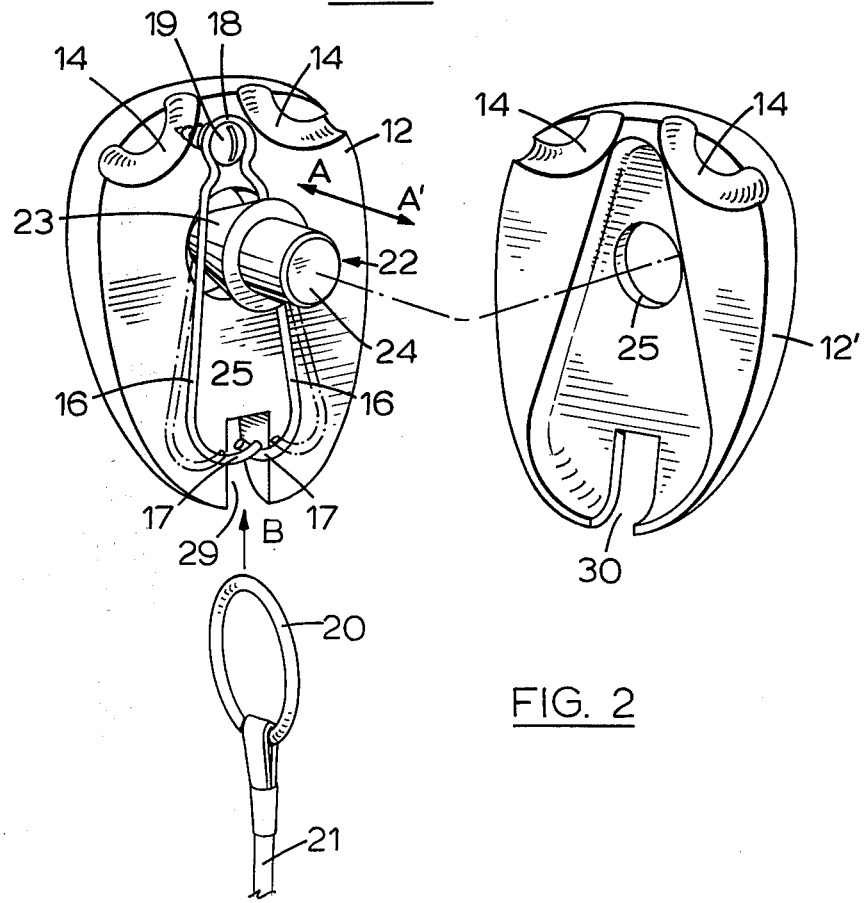

In order that the invention may be more clearly understood and more readily carried into effect the same will now, by way of example, be more fully described with reference to the accompanying drawing in which FIG. 1 is a view of a coupling device according to a preferred embodiment of the invention, the coupling device being shown with a first member connected thereto; and FIG. 2 is an exploded view on an enlarged scale of the coupling device shown in FIG. 1.

Referring to the drawing, 10 denotes generally a coupling device comprising a housing 11 which is in the form of two portions 12 and 12' securely interconnected by means (not shown). The portions 12, 12' of the housing 11 may be of molded plastics material.

Connected to the housing 11 is a first-member constituted by a flexible chain-like element 13 the upper ends of which are connected to the end portions of a neck band or strap (not shown) which is adapted operatively to be disposed around the neck of a musician, the element 13 being disposed through channels which are provided in the housing 11 and each of which is constituted by mating grooves 14 formed in the portions 12 and 12' of the housing 11 as shown in FIG. 2. Between the neck band or strap and the coupling device 10 the element 13 is disposed through a length adjuster 15 which may be of conventional form and the location of which is adjustable to vary, as desired, the effective length of the element 13 between the neck band or strap and the coupling device 10.

With particular reference to FIG. 2, the coupling device 10 also comprises opposed resilient closure members 16 which have adjacent end portions 17, the ends of the closure members 16 remote from the end portions 17 being integrally interconnected by a portion 18 which is secured to the housing 11, and more particularly to the portion 12 thereof, by, for example, a screw member 19. Thus, the closure members 16 are thereby mounted in the housing 11.

The adjacent end portions 17 of the closure members 16 are resiliently urged, by the inherent resiliency of the closure members 16 which may be formed of a spring steel material, towards a closed condition in which a second member is connectible thereto, as is hereinafter more fully described, this closed condition being shown in full lines in FIG. 2. In the preferred embodiment of the invention as herein described with reference to the accompanying drawing, the above-mentioned second member is constituted by a ring member 20 which is connected by, for example, a thong 21 to a musical instrument such as a saxophone (not shown).

As hereinbefore stated, however, it is to be emphasized that the coupling device 10 of the present invention may be used releasably to interconnect substantially any first member with substantially any second member.

The closure members 16 are movable, against the inherent resiliency thereof, to an open condition of the end portions 17, this open condition being shown in chain-dotted lines in FIG. 2. An actuating member which is denoted generally by the reference numeral 22 and which is mounted on the housing 11 is movable, in the directions of the arrows A and A' between a first position in which this actuating member 22 permits the end portions 17 to attain the closed condition thereof under the influence of the above-mentioned inherent resiliency of the closure members 16, and a second position in which the member 22, by contact with the closure member 16, maintains the end portions 17 in the open condition thereof against the influence of the above-mentioned inherent resiliency of the members 16.

The actuating member 22 comprises a portion 23 of frusto-conical form which thus presents opposed cam faces for urging the closure members 16 from said closed condition to said open condition of the end portions 17 on movement of the actuating member 22 in the direction of the arrow A from the first position to the second position thereof. The actuating member 22 also presents a cylindrical portion 24 which is disposed through an aperture 25 provided in the portion 12' of the housing 11 when the portions 12 and 12' are interconnected as shown in FIG. 1, this portion 24 of the actuating member 22 being manually operable for movement of the member 22 from the first position to the second position thereof.

The annular face 25 of the portion 23 adjacent to the portion 24 of the actuating member 22 constitutes a shoulder which, when the actuating member 22 is in the first position thereof, is in abutting contact with the part of the portion 12' surrounding the aperture 25 thereby to retain the actuating member 22 within the housing 11 by preventing movement of the member 22 from the first position in a direction away from the second position.

As in clearly shown in FIG. 2 the closure members 16 are reflexly directed at the end portions 17 thereof so that with the coupling device 10 in the orientation shown in the drawing these end portions 17 are, in other words, upwardly inclined. The purpose of this feature of the preferred embodiment of the present invention is that with the ring member 20 initially disconnected from the coupling device 10 this ring member 20 may be moved in the direction of the arrow B thereby to apply to force to the end portions 17 in the direction towards the actuating member 22, this force because of the above-described reflexly directed form of the closure members 16 at the end portions 17 urging these end portions 17 to the open condition in which the ring member 20 is connectible to the coupling device 10.

A slot 27 having an open end 28 is provided in the housing 11, a portion 29 of this slot 27 being provided in the portion 12 of the housing 11, and the remaining portion 30 of the slot 27 being provided in the portion 12' of the housing 11. The end portions 17 of the closure members 16 are, at least when in the closed condition thereof, disposed within the slot 27.

It is considered that the operation of the coupling device 10 will be readily apparent from the foregoing description. Thus, with the actuating member 22 initially in the first position thereof, the closure members 16 disposed with the end portions 17 in the closed condition thereof and the ring member 20 disconnected from the coupling device 10 this ring member 20 may, by movement thereof in the direction of the arrow B, engage and apply a force to the end portions 17 to urge these end portions 17 against the inherent resiliency of the closure members 16 to the open condition thereof thereby permitting the ring member 20 to be connected to the coupling device 10, since as the appropriate part of the ring member 20 passes between the end portions 17 when in the open condition these end portions 17 then return to the closed condition thereof under the influence of the inherent resiliency of the closure member 16. When it is subsequently desired to disconnect the ring member 20 from the coupling device 10 the actuating member 22 is moved in the direction of the arrow A from the first position to the second position thereof by manual movement of the portion 24 of the member 22. This results in the end portions 17 being urged against the inherent resiliency of the closure member 16 from the closed condition to the open condition thereof, thereby to permit the ring member 20 to be withdrawn. On releasing the portion 24 of the actuating member 22 the end portions 17 are returned to the closed condition thereof under the influence of the inherent resiliency of the closure members 16 which also causes the actuating member 22 to be returned in the direction of the arrow A' from the second position to the first position thereof.

It will of course be understood that, if desired, the actuating member 22 may be manually moved in the direction of the arrow A from the first position to the second position thereof thereby to urge the end portions 17 from the closed condition to the open condition thereof against the inherent resiliency of the closure members 16 in order to permit the ring member 20 to be connected to the coupling device 10.

Thus, the coupling device 10 permits quick and convenient connection and disconnection of a second member with a first member, and in addition, particularly where the first member is constituted by an element 13 and an associated neck band or strap and the second member is constituted by the ring member 20 connected to a musical instrument such as a saxophone, it is substantially impossible for the coupling device 10 to cause damage or injury by catching on the clothing of the musician or on, for example, an adjacent music stand or microphone cord or by catching the hands of the musician. Furthermore, the external surfaces of the housing 11 of the coupling device 10 can readily be appropriately styled or decorated to enhance the showmanship of the musician.

What I claim as my invention is:

1. A coupling device comprising a housing to which a first member is connectible, opposed resilient closure members mounted in the housing with adjacent end portions of said closure members being urged by the inherent resiliency of the closure members towards a closed condition in which a second member is connectible thereto, and an actuating member mounted on the housing and movable between a first position in which the actuating member permits said adjacent end portions of the closure members to attain said closed condition under the influence of said inherent resiliency of the closure members, and a second position in which the actuating member extends between and is in contact with the closure members to maintain said adjacent end portions thereof in an open condition against the influence of said inherent resiliency of the closure members, the actuating member having opposed cam faces for urging the closure members against said inherent resiliency of the closure members from said closed condition to said open condition of said adjacent end portions of the closure members on said movement of the actuating member from said first position to said second position thereof.

2. A coupling device according to claim 1, wherein the housing is provided with an aperture through which the actuating member is disposed for manual movement thereof from said first position to said second position thereof, the actuating member having a shoulder which is in abutting contact with the portion of the housing adjacent to said aperture when the actuating member is in said first position thereof to prevent movement of the actuating member from said first position in a direction away from said second position.

3. A coupling device according to claim 1, wherein the opposed closure members are reflexly directed at said adjacent end portions thereof, for urging of said adjacent end portions to said open condition thereof by a force applied thereto in a direction towards the actuating member when said adjacent end portions are in said closed condition thereof.

4. A coupling device according to claim 1, wherein the housing is provided with a slot having an open end and within which said adjacent end portions of the closure members are disposed when in said closed condition.

5. A coupling device according to claim 1 wherein the ends of the opposed closure members remote from said adjacent end portions thereof are integrally interconnected, the closure members being mounted in the housing by securement of said remote ends of the closure members to the housing.

* * * * *